(12) United States Patent
Paquet et al.

(10) Patent No.: US 6,631,024 B2
(45) Date of Patent: Oct. 7, 2003

(54) METHOD FOR THE FABRICATION OF PATTERNED POLED DIELECTRIC STRUCTURES AND DEVICES

(75) Inventors: Carl Paquet, San Jose, CA (US); Jocelyn Lauzon, St-Augustin-de-Desmaures (CA); Sylvain Derome, Kanata (CA); Chiara Meneghini, Sainte-Foy (CA)

(73) Assignee: Institut National d'Optique, Quebec (CA)

( * ) Notice: Subject to any disclaimer, the term of this patent is extended or adjusted under 35 U.S.C. 154(b) by 242 days.

(21) Appl. No.: 09/796,832

(22) Filed: Mar. 1, 2001

(65) Prior Publication Data

US 2002/0122240 A1 Sep. 5, 2002

(51) Int. Cl.⁷ .............................................. G02F 1/355
(52) U.S. Cl. ...................................................... 359/326
(58) Field of Search .................................. 359/326–332

(56) References Cited

U.S. PATENT DOCUMENTS

| | | | |
|---|---|---|---|
| 5,193,023 A | 3/1993 | Yamada et al. | 359/245 |
| 5,519,802 A | 5/1996 | Field et al. | 385/129 |
| 5,714,198 A * | 2/1998 | Byer et al. | 427/163.2 |
| 5,875,053 A | 2/1999 | Webjorn et al. | 359/326 |
| 2002/0114059 A1 * | 8/2002 | Bonfrate et al. | 359/332 |

* cited by examiner

*Primary Examiner*—John D. Lee
(74) *Attorney, Agent, or Firm*—Merchant & Gould P.C.

(57) ABSTRACT

The present invention concerns a method for fabricating a patterned, poled dielectric structure, comprising the steps of providing a material, patterning a periodic pattern into a first surface, applying an electrode to the first surface, and applying a voltage to the electrode to create a domain inversion in the material. Preferably, the material is a ferroelectric material, and the electrode is a single, planar, solid electrode. The method proposed herein is simple, reproducible and economical, as compared to prior methods. Patterned, poled dielectric structures are used to generate optical frequency conversion, by creating quasi-phase matching between two optical signals.

13 Claims, 3 Drawing Sheets

METHOD FOR THE FABRICATION OF PATTERNED POLED DIELECTRIC STRUCTURES AND DEVICES

FIELD OF THE INVENTION

The present invention relates to a method for the fabrication of patterned poled dielectric structures and devices. Such devices are useful for generating optical frequency conversion, by creating quasi-phase matching between two optical signals.

DESCRIPTION OF THE PRIOR ART

Patterned poled dielectric structures and devices offer the possibility of making optical frequency conversion. This has many applications in the field of optics. For example, such devices can be used to create second harmonic generation (SHG) of a laser signal in order to obtain a shorter wavelength signal. Other applications include sum frequency generation (SFG) and difference frequency generation (DFG). In fact, in association with a parametric oscillator, these devices can be used to make frequency tunable laser source, offering a very wide band of wavelength output. Frequency conversion is also sought after for network reconfiguration in wavelength division multiplexing systems.

The two most commonly known methods of fabrication of domain inversion patterns in ferroelectric materials are very similar to one another, and are described in U.S. Pat. Nos. 5,193,023 and 5,519,802. Both of these patents describe the use of a patterned electrode structure to make a domain inversion in ferroelectric materials; however, different techniques are proposed. Although these techniques have proven successful, making the needed electrode pattern is a complex and time-consuming process that is not perfectly reliable.

In U.S. Pat. No. 5,875,053, there is described an allegedly more production-friendly technique for the fabrication of these elements, which is based on using very simple, single, planar-applied liquid electrodes. In order to create the domain inversion pattern, electric insulators are locally implanted underneath one of the electrodes. The local electrical insulation is insured by impurity diffusion or local treatment of the ferroelectric material by an electron beam. Although the electrode structure is much simpler, the method for implanting local insulator regions in the ferroelectric material is not, and is associated with very complex, high-cost and not commonly available material.

SUMMARY OF THE INVENTION

It is thus an object of the invention to provide a simple, reproducible and economical method for the fabrication of patterned, poled dielectric structures or devices.

In accordance with the invention, this object is achieved with a method for fabricating a patterned, poled dielectric structure, comprising the steps of providing a material having a first and second surfaces, patterning a period pattern into the first surface, applying an electrode to the first surface, applying another electrode to the second surface, and applying a voltage between the electrodes to create a domain inversion in the material.

Preferably, the material is a ferroelectric material, and the electrode is a single, planar, solid electrode.

BRIEF DESCRIPTION OF THE DRAWINGS

The present invention and its advantages will be more easily understood after reading the following non-restrictive description of preferred embodiments thereof, made with reference to the following drawings in which.

DESCRIPTION OF A PREFERRED EMBODIMENT OF THE INVENTION

The present invention concerns the field of patterned poled dielectric structures and devices. As mentioned previously, such optical waveguides are used to generate optical frequency conversion by creating quasi-phase matching between two optical signals. The first signal is incident, and propagated within the device at a certain frequency (wavelength). The second signal is generated within the device, from the incident signal, and propagates in parallel to the incident signal, as a second, quasi-phase matched frequency (wavelength). The frequency generation is insured by using a material having a large second order susceptibility ($\chi^2$) such as lithium niobate crystals ($LiNbO_3$).

The quasi-phase matching is insured by making periodic modifications to the polarization of the material along the path of the incident signal. The permanent, local material polarization change is usually created by domain inversion caused by applying a high voltage at the surface of the material. A ferroelectric material, such as lithium niobate crystal, will have its optical properties permanently modified by the application of such a local high voltage. Using a periodically shaped electrode, as in the prior art, it is possible to make the necessary material polarization modulation, at the required period, in order to obtain a waveguide offering the possibility of generating optical frequency conversion.

Stated generally, the invention is a simple, reproducible and economical fabrication method for patterned poled dielectric structures or devices. According to a broad aspect of the invention, the material is etched (or diced, or polished) periodically, creating a spatially disposed insulator pattern. In combination with a solid, single electrode, the etched material will reproduce the same spatially disposed domain inversion pattern in the material, and thus the necessary material polarization change needed for the quasi-phase matching property required to create frequency conversion.

The fabrication method is different from the prior art, in that it proposes the use of a common etching technique to create air gaps, which act as local insulator regions. Consequently, a simple, planar, solid (as opposed to liquid) electrode is used on the surface that has been etched, but a liquid electrode can be used on the other, opposite surface. The two electrodes can easily be removed after the application of a voltage between them, once the domain inversion process is completed.

Typically, the air gaps will have a depth of approximately 10 $\mu$m, and a width of approximately 10 $\mu$m. However, it will be understood that different sizes are appropriate, depending on the period that is desired.

Figure 1:
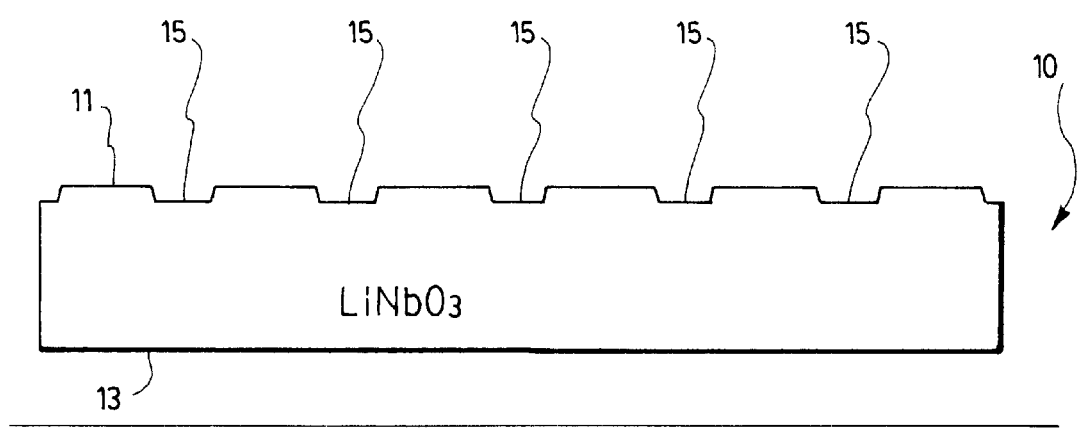
FIG. 1 is a cross-sectional representation of a periodically etched LiNbO3 crystal according to one aspect of the present invention.
Figure 2:
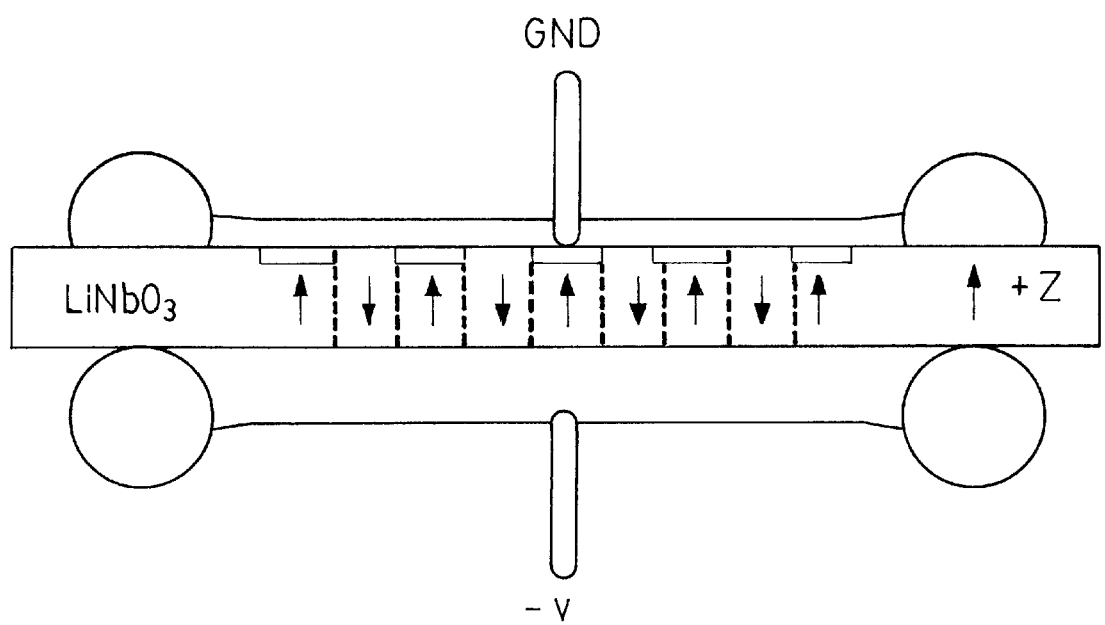
FIG. 2 is a schematic representation of a periodically-poled Lithium Niobate (PPLN) frequency converter with the electrodes applied thereto.
Figure 3:
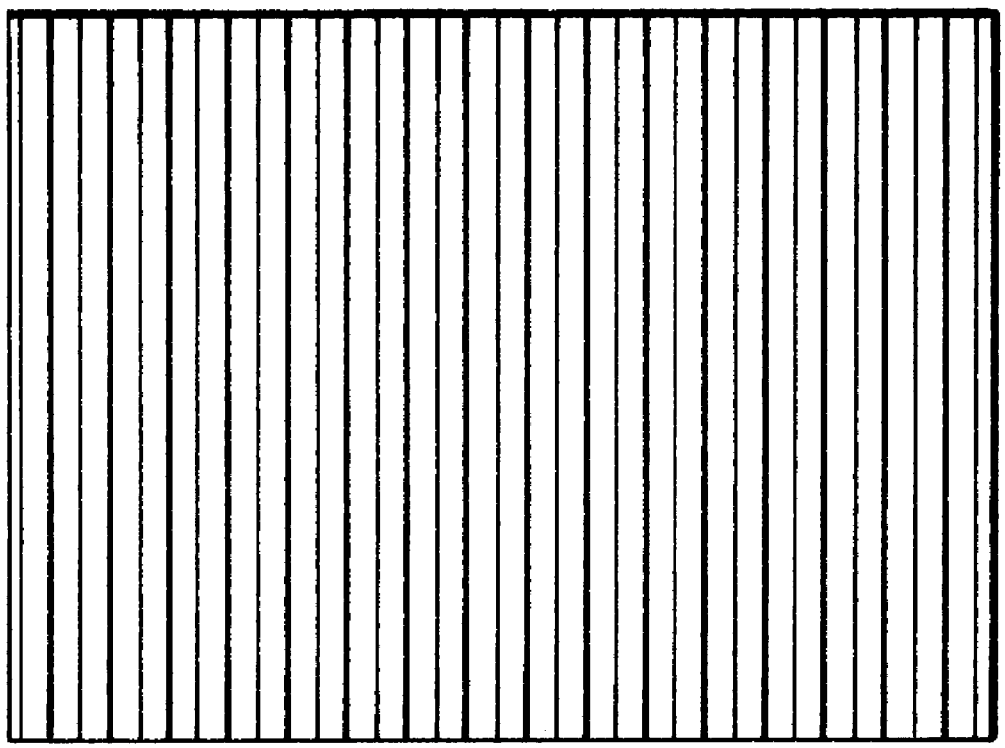
FIG. 3 is a top view of the PPLN of FIG. 2.

Referring now to FIGS. 1 to 3, and more particularly FIG. 1, there is shown a cross-section of a material for use with the fabrication method of the present invention. The material can be any type of ferroelectric material, and is more preferably a lithium niobate crystal ($LiNbO_3$).

The material 10 has a first and second opposite surfaces 11, 13 (it will be understood that the surfaces are major surfaces). On the first surface 11, a periodic pattern, which can be any two-dimensional pattern, is provided. Preferably, the pattern is made of depressions into the first surface, and so the step of patterning the first surface includes etching, dicing or polishing the pattern into the first surface. The pattern thus creates air gaps 15, which act as local insulators.

Consequently, when the material is subjected to a voltage between two electrodes, there is no need for a complicated, pre-patterned electrode to create the domain inversion in the material. A flat, solid electrode can be used for the first surface. On the second surface, however, a liquid electrode can be used (see FIG. 2).

Typically, the voltage that will be applied between the two electrodes is in the order of 12 kV and is applied for a few seconds (that is for a ferroelectric substrate having a thickness of 0.5 mm).

When the domain inversion has been completed, the electrodes are removed and the material can be used as a patterned, poled dielectric structure in order to generate optical frequency conversion. FIG. 3 is a top plan view of such a PPLN.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. A method for making a patterned poled dielectric structure, comprising the steps of:
   (a) providing a ferroelectric material having first and second opposite surfaces;
   (b) periodically patterning the first surface of said material;
   (c) disposing an electrode on the first surface;
   (d) disposing another electrode on the second surface; and
   (e) applying a voltage between said electrodes.

2. A method according to claim 1, wherein said step of periodically patterning the first surface of said material includes the step of etching regularly spaced depressions into said first surface.

3. A method according to claim 1, wherein said step of periodically patterning the first surface of said material includes the step of polishing regularly spaced depressions into said first surface.

4. A method according to claim 1, wherein said step of periodically patterning the first surface of said material includes the step of dicing regularly spaced depressions into said first surface.

5. A method according to claim 1, wherein said other electrode that is disposed on the second surface is a liquid electrode.

6. A method according to claim 5, wherein said electrode that is disposed on the first surface is a solid electrode.

7. A method according to claim 1, wherein said ferroelectric material is a lithium niobate.

8. A method according to claim 1, wherein said step of periodically patterning the first surface includes the step of making a two-dimensional pattern.

9. A method according to claim 1, wherein said method further includes the step of removing said electrodes.

10. A periodically patterned, poled ferroelectric material for use as an optical frequency converter, said material having first and second opposite surfaces, wherein said first surface is provided with a periodic pattern created by depressions in the first surface, and wherein the material contains a domain inversion created by applying a voltage between electrodes placed on the first and second opposite surfaces, the domain inversion being related to the periodic pattern.

11. A material according to claim 10, wherein said depressions are etched, polished or diced into the first surface.

12. A material according to claim 11, wherein said periodic pattern is a two-dimensional pattern.

13. A material according to claim 10, wherein said material is lithium niobate.

* * * * *